(12) United States Patent
Konanur et al.

(10) Patent No.: US 9,692,525 B2
(45) Date of Patent: *Jun. 27, 2017

(54) OPTIMAL ELECTRIC FIELD COUPLING TECHNIQUES FOR HUMAN BODY COMMUNICATION (HBC)

(71) Applicant: Intel Corporation, Santa Clara, CA (US)

(72) Inventors: Anand S. Konanur, San Jose, CA (US); Niranjan Karandikar, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/751,117

(22) Filed: Jun. 25, 2015

(65) Prior Publication Data

US 2016/0380703 A1    Dec. 29, 2016

(51) Int. Cl.
| | | |
|---|---|---|
| *H04B 5/00* | (2006.01) | |
| *H04B 13/00* | (2006.01) | |
| *G06K 19/07* | (2006.01) | |
| *G06K 19/077* | (2006.01) | |

(52) U.S. Cl.
CPC ....... *H04B 13/005* (2013.01); *G06K 19/0723* (2013.01); *G06K 19/07756* (2013.01); *H04B 5/0012* (2013.01)

(58) Field of Classification Search
CPC .............. H04B 5/0031; H04B 13/005; G06K 19/0723; G06K 19/07756

USPC ......................................................... 455/41.1
See application file for complete search history.

(56) References Cited

U.S. PATENT DOCUMENTS

| | | | |
|---|---|---|---|
| 6,173,899 B1 * | 1/2001 | Rozin | G06K 7/0008 235/449 |
| 9,306,628 B2 * | 4/2016 | Konanur | H04B 5/0031 |
| 2010/0085260 A1 | 4/2010 | McKinzie et al. | |
| 2011/0227856 A1 | 9/2011 | Corroy et al. | |
| 2013/0142363 A1 | 6/2013 | Amento et al. | |
| 2013/0231046 A1* | 9/2013 | Pope | G06K 9/00013 455/41.1 |
| 2014/0361628 A1 | 12/2014 | Huang et al. | |
| 2015/0093988 A1 | 4/2015 | Konanur et al. | |

OTHER PUBLICATIONS

International Search Report and Written Opinion received for PCT Patent Application No. PCT/US2016/036357, mailed on Aug. 24, 2016, 13 pages.

* cited by examiner

*Primary Examiner* — Eugene Yun
(74) *Attorney, Agent, or Firm* — Forefront IP Lawgroup of Christie and Rivera, PLLC (57) ABSTRACT

Described herein are architectures, platforms and methods for enhancing human body communications (HBC) mode during near field communication (NFC) related functions or transactions. Optimization of the HBC communications system can include a radio frequency (RF) tuning circuitry to generate a voltage-based resonant frequency at respective capacitive pads of transmitting and receiving devices. The RF tuning circuitry includes a series connected capacitor-inductor driver that may be constructed within or outside of an NFC module circuitry or NFC silicon.

20 Claims, 9 Drawing Sheets

OPTIMAL ELECTRIC FIELD COUPLING TECHNIQUES FOR HUMAN BODY COMMUNICATION (HBC)

BACKGROUND

A proximity-based wireless communication in use today employ inductive coupling between a resonant first coil antenna and a resonant second coil antenna. For smaller computing devices, a seamless interaction between these devices is becoming increasingly critical. Furthermore, since many of these computing devices are associated or in close proximity with a user's body (e.g., wristwatches, smartphones, smartcards, devices having tags, etc.), the user's body can play an important role in serving as a secure communication channel between the computing devices. This communication mode is typically referred to as human body communications (HBC) communication mode.

In traditional radiation-based communication modes such as radio frequency identifier (RFID), Bluetooth (BT), wireless fidelity (WiFi), Cellular, or the like, a communication from a transmitter to a receiver may occur over a distance of several meters and sometimes beyond line of sight. However, such radiation-based communication suffers from a key disadvantage, which is determining a user intent. In other words, it is substantially hard to determine which of the many devices that are within communication range need to be paired to enable communication. For example, in the RFID communication mode, some smartcards or devices with tags can be read from several meters away and beyond the line of sight of a reader. However, RFID techniques may suffer from bad selectivity. In other words, devices within the detection range is detected and a use of threshold is difficult to control. Furthermore, there is a limited transport security in a sense that all readers of a given proximity technology can read information from the devices with tags.

As such, there is a need for a design to enhance HBC communication mode to overcome at least these cited disadvantages.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for an optimal HBC communications system to implement near field communication (NFC) related functions or transactions. For example, the optimization of the HBC communications system includes an installation of a radio frequency (RF) tuning circuitry to generate a voltage-based resonant frequency at respective capacitive pads of transmitting and receiving devices. In this example, the RF tuning circuitry includes a series connected capacitor-inductor driver that may be constructed within or outside of an NFC module circuitry or NFC silicon. Furthermore, the series connected capacitor-inductor driver may be adjusted to generate the voltage-based resonant frequency based from a resulting capacitive coupling from the capacitive pad and other parasitic capacitances/inductances from the NFC module circuitry during the NFC related functions or transactions.

In the implementations described herein, a modification in a front-end impedance matching topology of an NFC transmitter is implemented to reuse traditional radios such as Near Field Communication (NFC) radios. The modification, for example, may be built-in or integrated in the NFC silicon to implement NFC like functions transactions but through 'touch' rather than 'tap' technique.

Figure 1:
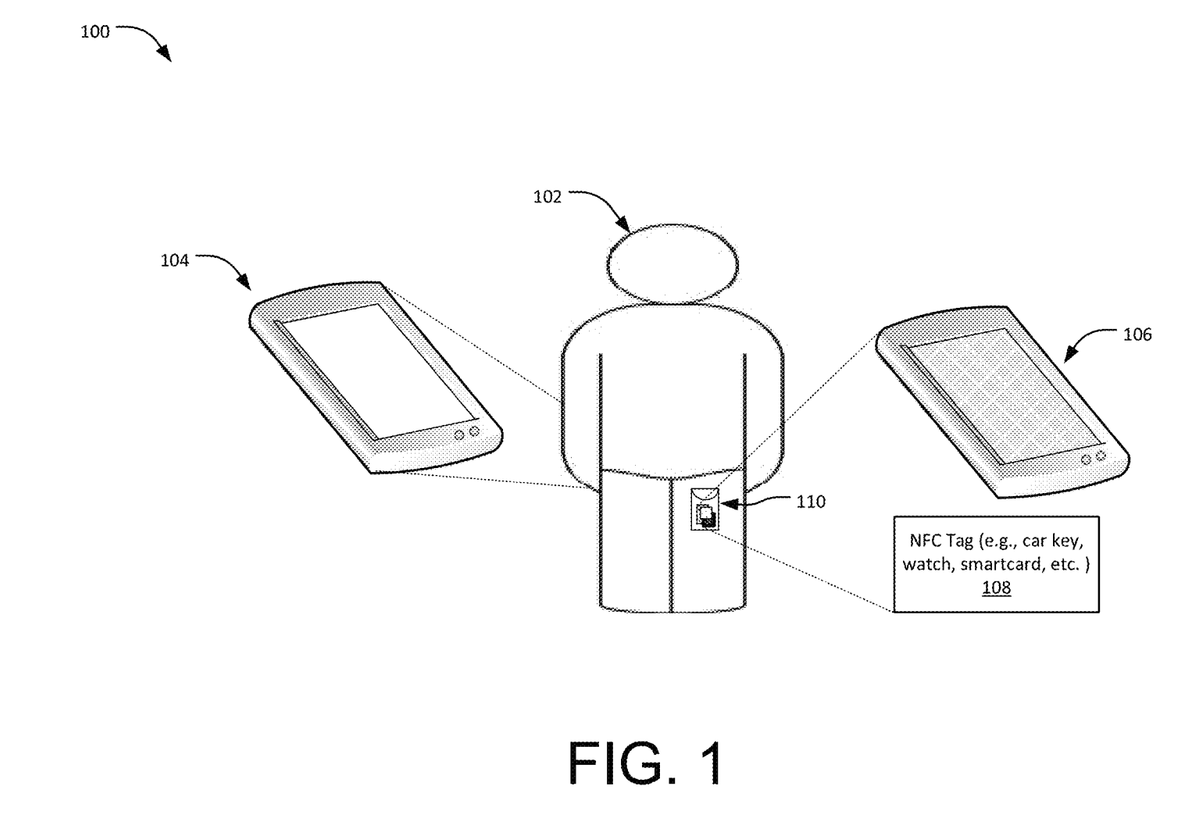
FIG. 1 is an example scenario illustrating a HBC communications arrangement as described in implementations herein.

FIG. 1 is an example scenario 100 that illustrates a HBC communications arrangement as described in implementations herein. The HBC communications arrangement, for example, includes a proximity-based data communication between devices that may use a human body (e.g., user 102) as a communication medium. In this example, the HBC communications arrangement may be integrated with a standard NFC communication system that utilizes, for example, a NFC antenna for NFC communications or NFC related transactions. As described herein, these two scenarios (i.e., HBC and standard NFC communications) may be implemented by a hybrid communication circuitry (or hybrid circuitry).

As shown, the scenario 100 includes the user 102 who is holding and/or operating a (portable) device 104 in his right hand while another (portable) device 106, and an NFC tag 108 are placed in a resting position inside a user's pocket 110. Although not shown, the devices 104, 106, and 108 may employ the hybrid circuitry in order to engage in HBC-based communications that use the body of the user 102 to facilitate the proximity-based communications.

The devices 104 and 106 may include, but are not limited to, Ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. On the other hand, the NFC tag 108 may include, but is not limited to, a radio frequency identification (RFID) card, a key tag, a common access card, or any other form of smart card.

In an implementation, the user 102 plans to transmit a stored information from the device 104 to the device 106 that may be presently tucked at user's pocket 110. The user 102 in this case touches or nearly touches a capacitive pad (not shown) of the device 104 and initiates a proximity-based polling with the portable device 106 for an HBC communications mode. The initiation of the proximity-based polling, for example, may include sending an actual request signal by the requesting device 104 to the portable device 106 to establish the HBC data communication or, the initiation may utilize a unique voltage threshold due to association or proximity of the devices 104, 106, and 108 to the user 102.

With regard to the sending of the initial request signal, the hybrid circuitry in the devices 104 and 106 may facilitate an efficient transfer of the request signal due to an increase in voltage across capacitive pads of the devices 104 and 106. Upon receiving and subsequent approval of the request signal by the receiving portable device 106, the HBC data communication between the two devices is established and the portable device 104 may start transmission of the stored information to the portable device 106.

For the unique pre-configured voltage threshold, the devices 104 and 106 may be configured to utilize the voltage threshold for secured selectivity. For example, their respective hybrid circuitry facilitates the increase in voltage across capacitive pads of the devices 104 and 106 in the HBC communication system. In this example, the devices 104 and 106 may easily determine and distinguish that they are associated or within a close proximity of the user 102 based from the detected voltage across the capacitive pads during the initiation of the HBC data communication.

As opposed to a detecting device (not shown) that is within range—but is not associated or in close proximity to the user 102—the use of voltage threshold for secured selectivity on a second device may be hard to implement because this second detecting device may receive similar amount of signal strengths, for example, from the devices 104 or 106. As such, the pre-configured voltage threshold as mentioned above may be utilized to obtain a secured connection without the need of other forms of identification such as a password, challenge question, facial features, etc. from the user 102 or from the transmitting device 104.

In an implementation, the hybrid circuitry may facilitate the establishment of data communications between the devices 104 and 106 based on the voltage threshold across the capacitive pads between these devices. In this implementation, the higher voltage across the capacitive pads due to (series resonance) hybrid circuitry may optimize implementation of data communications between the devices 104 and 106 using the body of the user 102 as the communication medium. The series resonance hybrid circuitry may be implemented through a software, firmware, hardware, or a combination thereof, to increase the voltage across the capacitive pads at resonant frequency. The voltage-based resonant frequency, for example, includes the standard frequency of about 13.56 MHz for proximity-based communications.

In another scenario, the user 102 may actually be holding in his left hand (i.e., in contact) the devices 106 and 108. In this other scenario, the user 102 may select the standard NFC communication mode of the devices 104, 106, and 108 by placing them in close proximity with one another. For example, the portable device 104 establishes near field coupling by aligning its coil antenna (not shown) in the direction and within a certain distance of the NFC tag 108 (e.g., credit card). At this certain distance, a principle of mutual induction between credit card strips (not shown) and the coil antenna may facilitate data communications between the credit card 106 and the portable device 104. This standard NFC communication mode may be contrasted with the HBC communications mode that does not require the need of placing the devices' respective NFC antennas in close proximity with one another.

In an implementation, the hybrid circuitry may be configured to toggle or switch between the NFC communication mode that may implements a current-based parallel resonance, and the HBC communications mode—which implements a voltage-based series resonance. In another implementation, the hybrid circuitry may implement at the same time the NFC and HBC communication modes as further discussed below.

Figure 2:
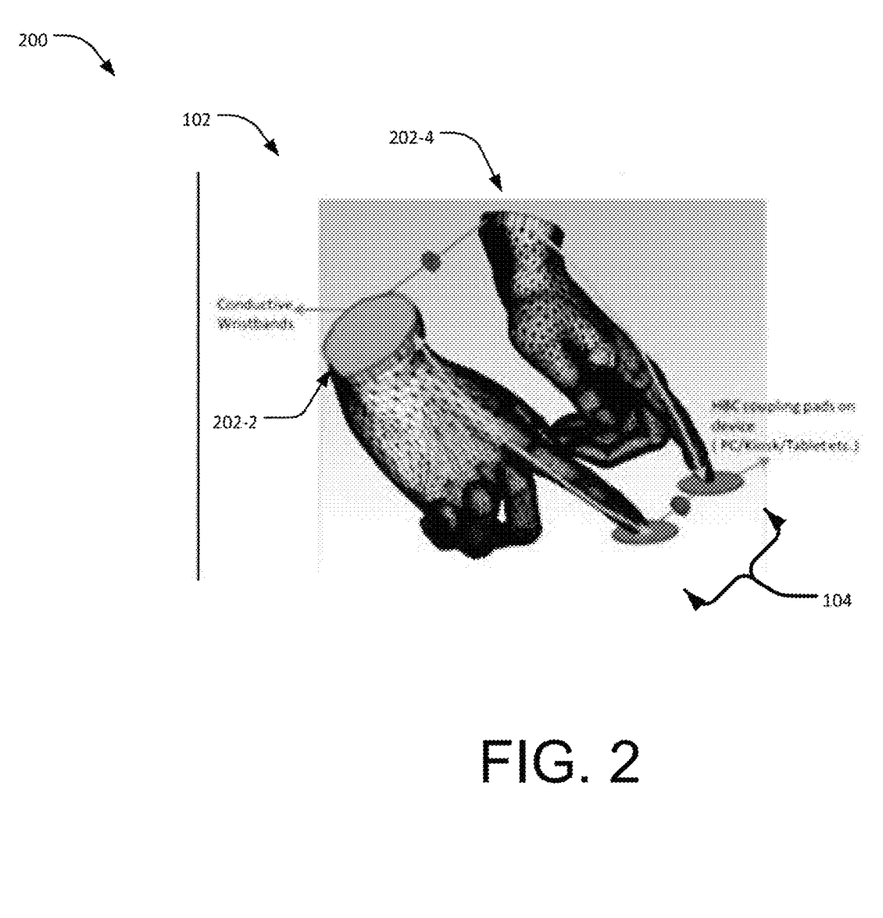
FIG. 2 is another example scenario illustrating a HBC communications arrangement as described in implementations herein.

FIG. 2 is another example scenario 200 that illustrates a HBC communications arrangement as described in implementations herein. As opposed to the previous example scenario 100, the example scenario 200 shows the user 102 who is operating the capacitive pad of the device 104 with both hands in HBC communication mode. As shown, the user 102 is wearing conductive wristbands 202-2 and 202-4 that facilitate formation of a closed circuit between the user 102 and capacitive pad of the device 104 without recourse to grounding path involving the environment. The conductive wristbands 202, for example, creates inductive and/or capacitive coupling between them to provide a more robust connection without regard to the grounding path involving the environment. In this example, however, the flexibility of how the user 102 interacts with the device 104 may be reduced since the inductive and/or capacitive coupling may depend from the distance between the conductive wristbands 202-2 and 202-4.

Figure 3:
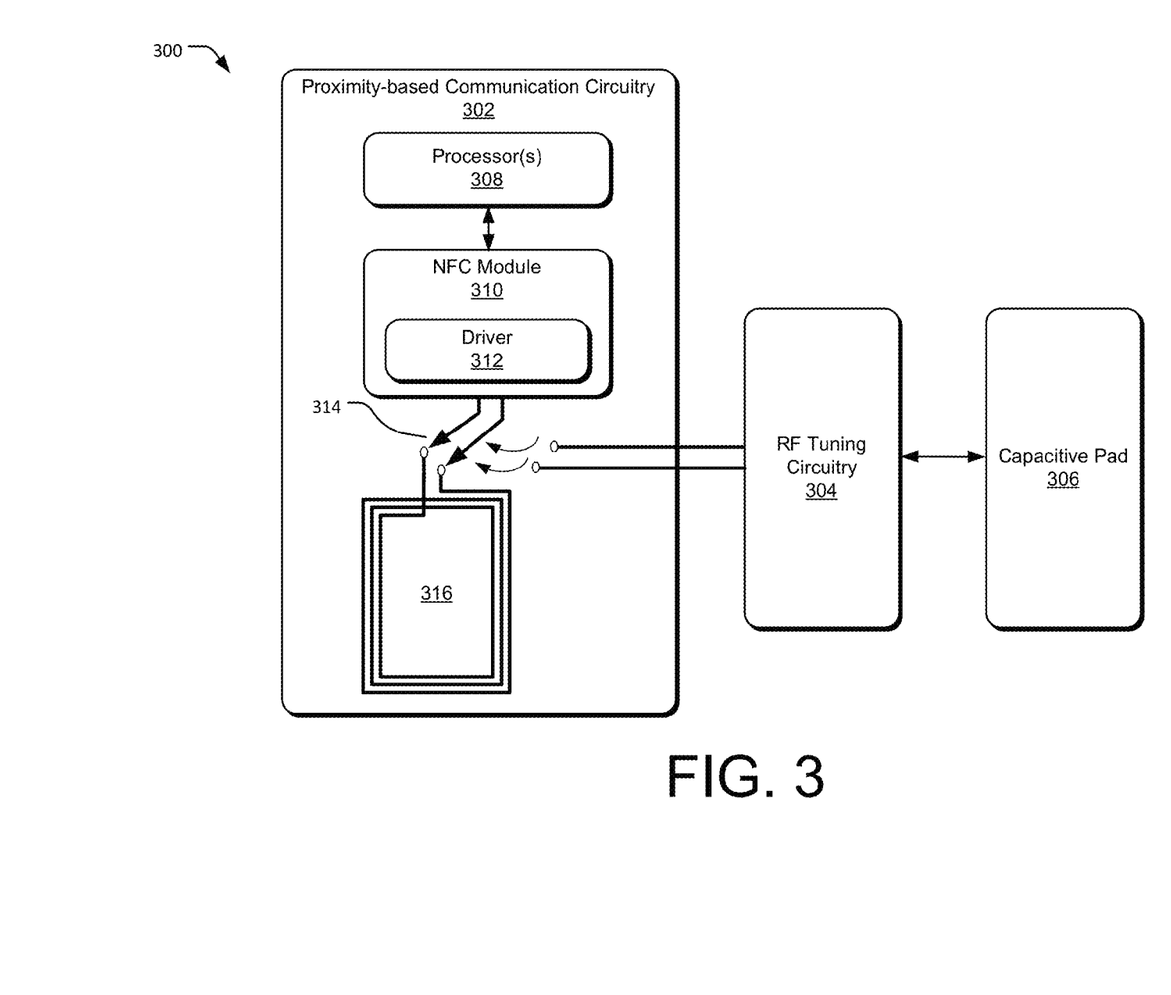
FIG. 3 is an example hybrid circuitry that is configured to implement the voltage-based resonant frequency as described herein.

In an implementation, the hybrid circuitry as discussed in FIG. 1 above may further optimize the HBC communication arrangement in the example scenario 200. That is, the hybrid circuitry that provides the higher voltage across the capacitive pads due to (series resonance) may further optimize data communications between the device 104 and the other devices 106 and 108 using the body of the user 102 as the communication medium FIG. 3 illustrates an example hybrid circuitry 300 that is configured to implement the voltage-based resonant frequency as described herein. The voltage-based resonant frequency, for example, is implemented during the HBC communications system that utilizes the body of the user 102 as the communication medium for NFC related functions or transactions.

As shown, the hybrid circuitry 300 includes a proximity-based communications circuitry 302 that may be utilized for standard NFC communication mode, a RF tuning circuitry 304, and a capacitive pad 306. The proximity-based communications circuitry 302 further includes a processor(s) 308, a NFC module 310, a driver 312, switches 314, and a NFC (coil) antenna 316. Although the hybrid circuitry 300 generally shows three different separate components 302, 304 and 306, the proximity-based communications circuitry 302 and the RF tuning circuitry 304 may be disposed in a single module rather than in different silicon chips. The hybrid circuitry 300, as illustrated, may be found in the devices 104-106 as described herein.

In an implementation, such as in the earlier scenario where the user 102 plans to transmit stored and secured information from the device 104 (which the user 102 is presently operating) to the device 106 (which is presently located in user's pocket 110), the hybrid circuitry 300 is disposed at front-end modules of these devices 104 and 106. In this implementation, the user 102 may activate the HBC communication system mode to implement the data communication between the devices 104 and 106. With the activated HBC communication system mode, the driver 308 acts as a voltage driver to the RF tuning circuitry 304 and the driver 308 may utilize components (not shown) such as a dummy series resistor, an operational amplifier (Op-Amp), and the like, to build the voltage driver.

As described herein, when the HBC communication system mode is activated, the RF tuning circuitry 304 may be configured to generate higher voltage across the capacitive pad 306. For example, the RF tuning circuitry 304 may include a series connected capacitor-inductor components (not shown) that are configured to obtain the voltage-based resonant frequency for the HBC communication system. In this example, the voltage-based resonant frequency may generate an electric field that increases the voltage across the capacitive pad 306 in order to facilitate a secured connection between the devices 104 and 106.

The secured connection, for example, may be based from the effect of the increased voltage across the capacitive pad 306 to the body of the user 102 as the communication medium. For example, the transmitting device 104 and the receiving device 106 may detect higher voltages or signal strength between them as opposed to the other detecting devices that are within range but are not presently associated or in close proximity to the user 102. In this example, a higher voltage-threshold may be pre-configured for selectivity purposes such as, for example, when a determination is made as to whether the devices 104 and 106 are within proximity or associated with the user 102.

With continuing reference to FIG. 3, the processor(s) 308 may include a software, firmware, hardware, software, or a combination thereof, to control the operation of the hybrid circuitry 300 in general. For example, the processor 308 may be configured to determine the mode of data communications that may be applicable for the transfer of stored information from the device 104 to the device 106. In this example, the mode of data communications may include the use of the NFC antenna 316 for the standard NFC communication mode, or the use of voltage-based resonant frequency to enhance the use of the user's body for the HBC communication mode.

In an implementation, the processor 308 may send control signals to switches 314 when toggling or switching from the NFC communication mode to the HBC communication mode. In this implementation, processor 308 may use different time slots of fixed length for implementing implement the NFC communication mode and the HBC communication mode at the same time. In another implementation, the switches 314 may not be used and the driver 312 is permanently connected to the NFC antenna 316 and the RF tuning circuitry 304 during the NFC communication mode and the HBC communication mode, respectively.

The NFC antenna 316 may include a continuous loop of coil antenna that may be configured to have a resonant frequency of 13.56 MHz. During the HBC communication mode, the RF tuning circuitry 304 is similarly configured to have the voltage-based resonant frequency at 13.56 MHz. The resonant frequency in both cases facilitate maximum power transfer during transmit or receive operations between the devices 104 and 106.

As described herein, the NFC module 310 may be integrated with the NFC antenna 316 and/or the processor 308 to form a single module. Furthermore, the NFC module 310 may be configured to process electrical signals to be transmitted or received through the NFC antenna 316.

Figure 4:
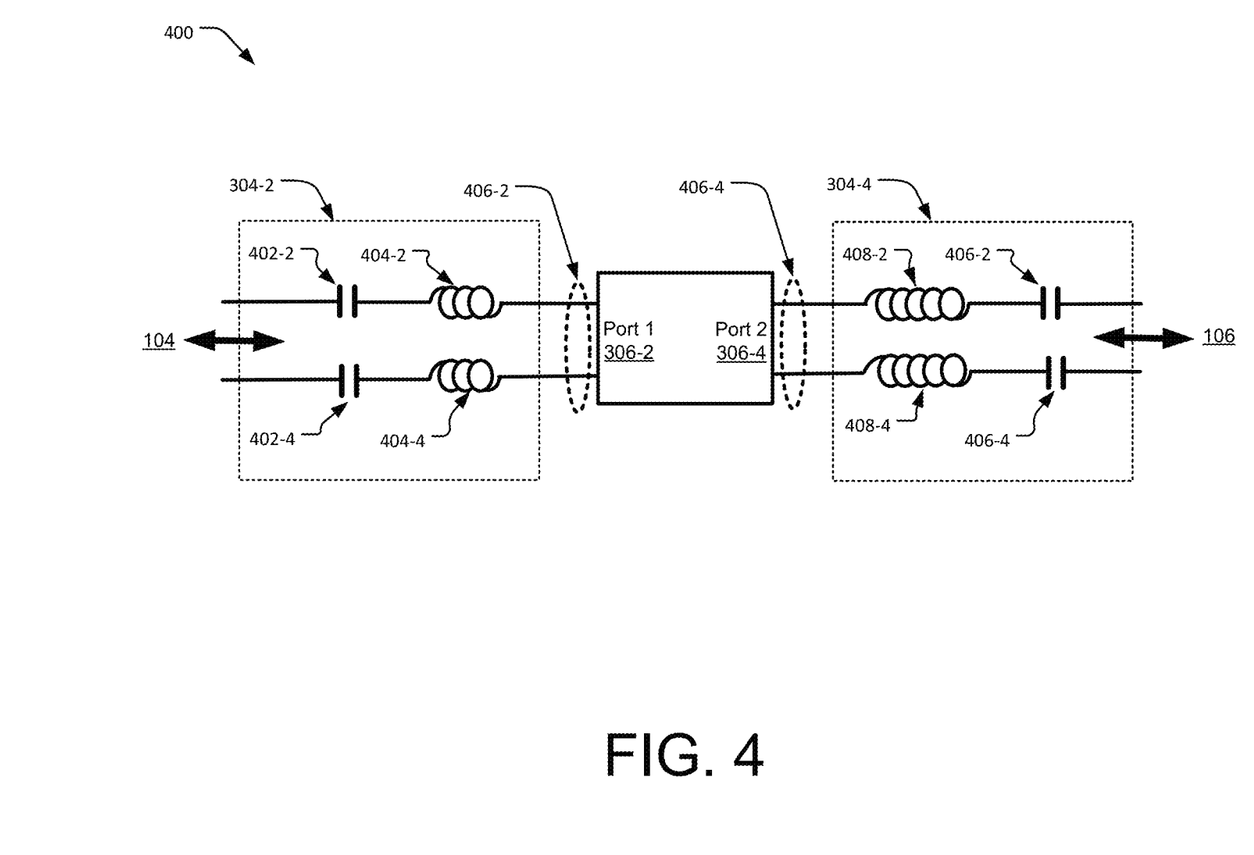
FIG. 4 is an example HBC communications system as described in present implementations herein.

FIG. 4 illustrates an example HBC communications system 400 as described in present implementations herein. The HBC communications system 400 illustrates, for example, the use of the RF tuning circuitry 304 to obtain the voltage-based resonant frequency that facilitates the HBC-based data communications between devices. In the example HBC communications system 400, the user 102 is assumed to be in contact or associated with the transmitting device 104 and the receiving device 106.

As shown, the HBC communications system 400 illustrates data communications between the transmitting device 104 and the receiving device 106. At the transmitting device 104 side, a RF tuning circuitry 304-2 includes an adjustable capacitor 402 that is in series with an inductor 404. Furthermore, the series adjustable capacitor 402—inductor 404 may be treated as in series with a capacitive coupling 406-2 that may be generated by the capacitive pad 306-2 of the transmitting device 104. Furthermore still, the RF tuning circuitry 304-2 is receiving signals from voltage driver 312 during the HBC communication mode.

As described herein, the voltage-based resonant frequency adjustment at the RF tuning circuitry 304-2 may be based at least from values of the series adjustable capacitor 402 and inductor 404, and the capacitive coupling 406-2 from the capacitive pad 306-2. In another implementation, inductance from the NFC antenna 316 and other parasitic capacitances from the proximity-based communications circuitry 302 may be further utilized, for example, for the adjustment of the voltage-based resonant frequency that is obtained by the RF tuning circuitry 304-2.

In an implementation, the voltage-based resonant frequency may generate higher amount of voltage across the capacitor pads 306-2 and 306-4 of the devices 104 and 106, respectively. To this end, a higher voltage threshold may be pre-configured to implement the secured selectivity feature of these devices. For example, the receiving device 106 may detect lesser amount of signal strengths from other devices that are within range but are not associated to the user 102. In this example, the use of the voltage threshold may be utilized as a basis for initiating or establishing data communications between the devices 104 and 106.

With continuing reference to FIG. 4, the receiving device 106 further shows its corresponding RF tuning circuitry 304-4, series-connected adjustable capacitor 406 and inductor 408, and a capacitive coupling 406-4 from the capacitive pad 306-4. Similar to the discussion in the transmitting side, the receiving device 106 may be further configured to have a voltage-based resonant frequency by adjusting, for example, the adjustable capacitor 406. In this example, the adjustment of the capacitor 406 may be based from the capacitive coupling 406-4, and the parasitic capacitance/inductance (e.g., NFC antenna) from the proximity-based communications circuitry of the receiving device 106. Furthermore, the RF tuning circuitry 304-4 may receive signal from the voltage driver of the receiving device 106.

Figure 5A:
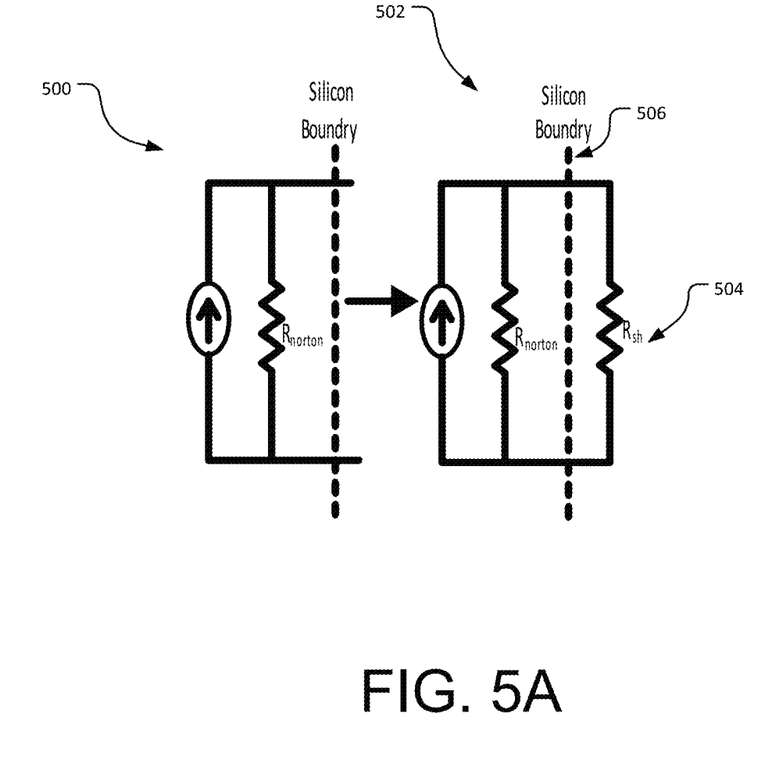
FIGS. 5A-5C show different configurations of implementing a driver component during a HBC communication mode as described herein.
Figure 5B:
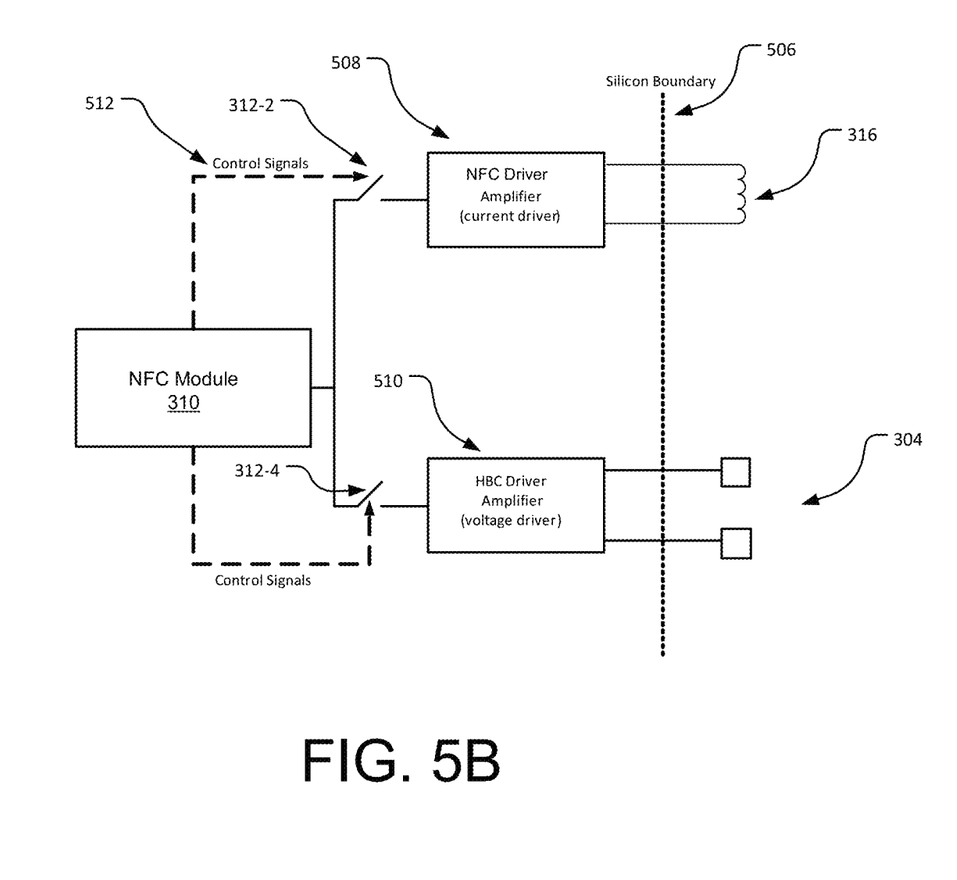
Figure 5C:
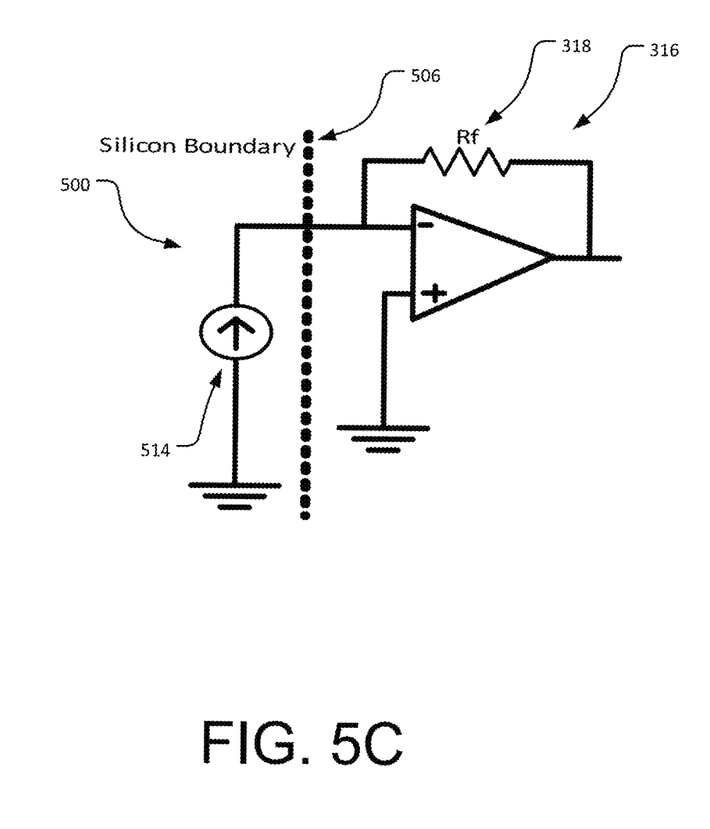

FIGS. 5A-5C show different configurations of implementing the driver component during the HBC communication mode. In an implementation, the driver 312 may be configured as a current driver and a voltage driver during the NFC communication mode and the HBC communication mode, respectively. In this implementation, the voltage driver-configuration of the driver 312 may be derived from the NFC circuitry, or it may implemented as a separate and independent voltage driver. Furthermore, the derived voltage driver-configuration may be disposed within or outside of the NFC silicon or chip.

FIG. 5A shows a Norton's equivalent circuit of a current driver configuration 500 of the driver 312 and a transformed voltage driver configuration 502 with the use of a dummy resistor 504 to convert the current driver-configuration to the voltage driver-configuration. As shown, the current driver configuration 500 may be an existing driver within a NFC silicon boundary 506 while the voltage driver configuration 502 is derived from this existing driver through the addition of the dummy resistor 504. In an implementation, the value of the dummy resistor 504 may be computed by the following expression:

$$Rsh = \frac{VDD - Vdsat}{Imax}$$

where, Rsh is the shunt dummy resistor 504, VDD is a supply voltage for the current driver configuration 500, Vdsat is a saturation voltage of a transistor used to build the current driver, and Imax is a maximum current supplied by the current driver configuration 500.

FIG. 5B shows two different driver amplifiers i.e., a NFC driver amplifier 508, which is a default current driver, and a HBC driver amplifier 510, which is a voltage driver. The HBC driver amplifier 510, for example, may be a separate and independent component from the NFC driver amplifier 508. In this example, the HBC driver amplifier 510 is not derived from the NFC driver amplifier 508.

As shown in FIG. 5B, the NFC and HBC driver amplifiers may be disposed within the NFC silicon 506 and connected to the NFC antenna 316 and RF tuning circuitry 304, respectively. Furthermore, the processor 308, through the NFC module 310, may utilize control signals 512 to implement the NFC and/or HBC communication modes.

FIG. 5C shows a current source 514, for example, of the current driver configuration 500, and an Op-Amp 516 that is configured to build the voltage driver for the driver 312. In an implementation, FIG. 5C illustrates a conversion of a current from the current source 514 to build the voltage driver by adding an external amplifier—Op-Amp 516 outside the NFC silicon 506. In this implementation, a gain of the Op-Amp 516 may be adjusted through its resistor Rf 318. Furthermore, the Op-Amp 516 facilitates a single-ended voltage driver as opposed to differential modes in FIGS. 5A and 5B above.

Figure 6:
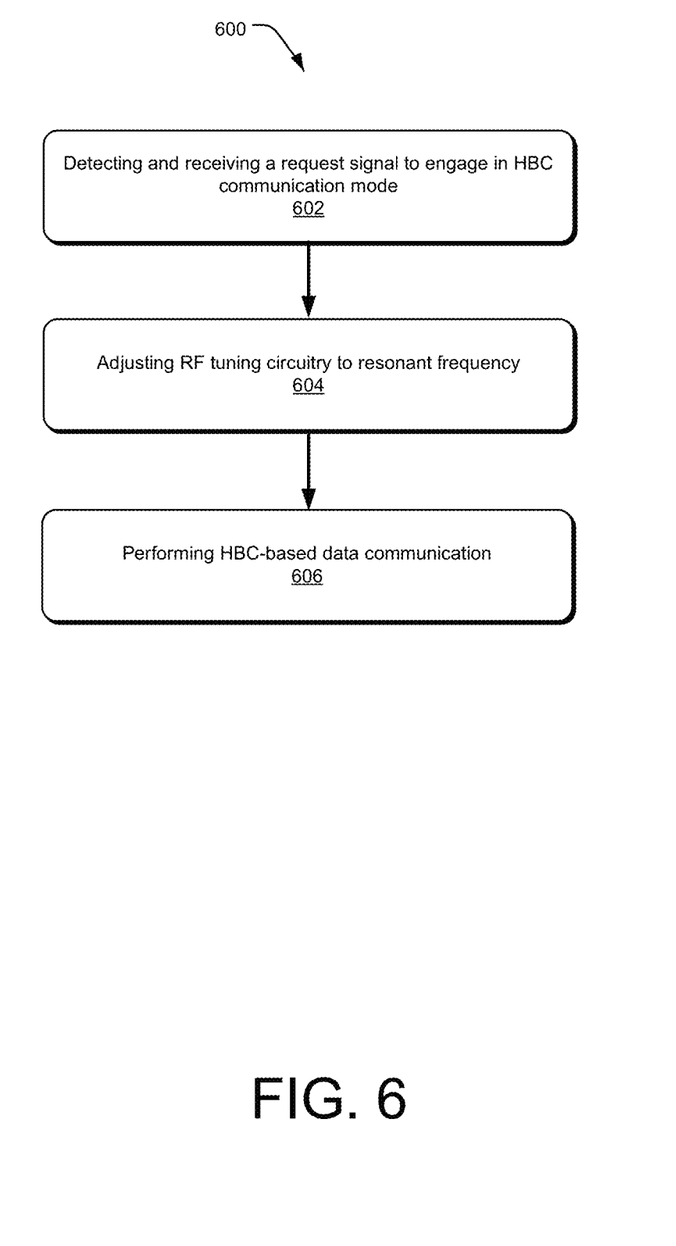
FIG. 6 is an example process chart illustrating an example method for implementing HBC communication mode at a receiving device for NFC related functions or transactions.

FIG. 6 shows an example process chart 600 illustrating an example method for implementing HBC communications at a receiving device for NFC related functions or transactions. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, detecting and receiving a request signal to engage in HBC communication mode is performed. For example, the receiving device 106 that is placed at the pocket 110 of the user 102 detects a request signal to engage in HBC communication mode with the transmitting device 104 that the user is presently holding. In this example, the device 106 detects the request signal based upon the signal strength (i.e., voltage threshold), or by receiving an actual request signal to engage in HBC communication.

At block 604, adjusting an RF tuning circuitry is performed. For example, the RF tuning circuitry 304 of the receiving device 106 includes a series adjustable capacitor 406 and an inductor 408. In this example, the adjustable capacitor 406 may be dynamically adjusted to resonate at a voltage-based resonant frequency of 13.56 MHz in order to gain enhanced HBC data communications with the transmitting device 104. The adjustment of the capacitor 304 may be further based from the values of the capacitive coupling 406-4 from the capacitive pad 306-4, and from the parasitic inductances/capacitances of proximity-based communication circuitry of the receiving device 104.

In an implementation, the RF tuning circuitry 304 is connected to a voltage driver-configuration of the driver 312 for the HBC communication mode. In this implementation, the driver 312 may include an existing current driver-configuration for the NFC communication mode, and the voltage—driver configuration is derived from the existing current driver-configuration.

At block 606, HBC data communication is performed.

Figure 7:
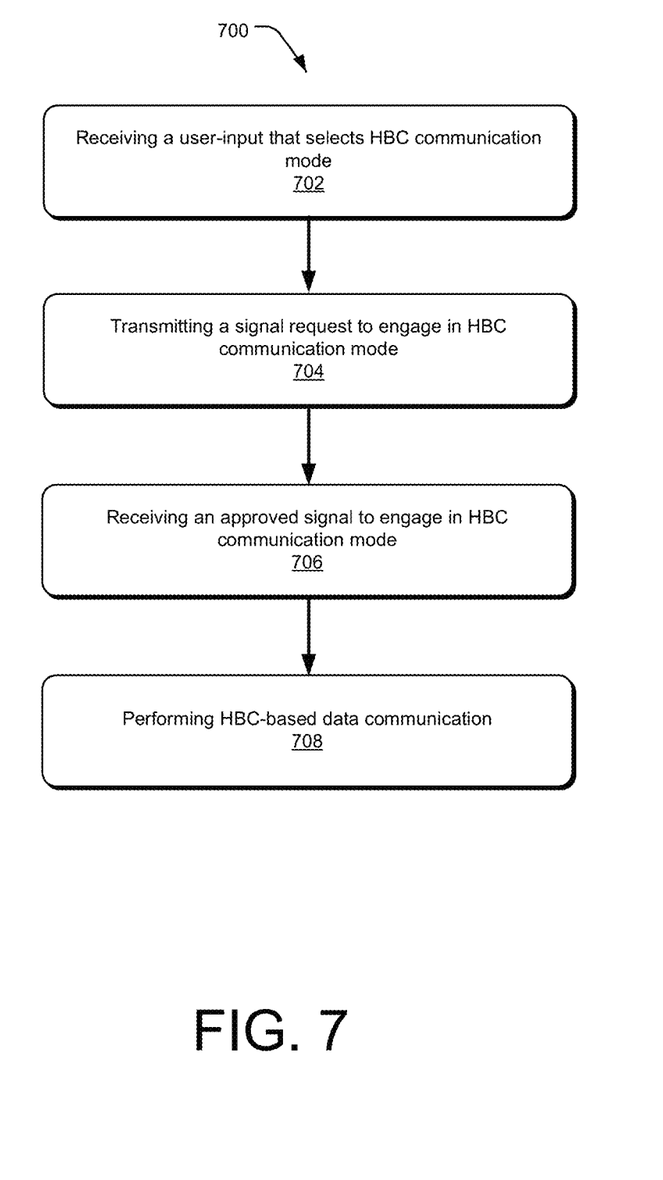
FIG. 7 is an example process chart illustrating an example method for implementing HBC communication mode at a transmitting device for NFC related functions or transactions.

FIG. 7 shows an example process chart 700 illustrating an example method for implementing HBC communications at a transmitting device for NFC related functions or transactions. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, a user-input that selects a HBC communication mode is received. For example, user 102 selects the HBC communication mode to transmit stored information from the transmitting device 104 to the receiving device 106.

At block 704, a signal request to engage in HBC communication mode is transmitted. For example, the transmitting device 104 transmits a signal request to the receiving device 106 to engage in HBC communication mode. In this example, the signal request may be in the form of signal strength or an actual polling signal.

At block 706, an approved signal to engage in HBC communication mode is received. For example, the receiving device 106 replies with approved signal to engage in HB communication mode.

At block 708, HBC-based data communication is performed.

The following examples pertain to further embodiments:

Example 1 is a device comprising: a capacitive pad configured to detect and receive a request signal to operate in a human body communication (HBC) communication mode; a proximity-based communication circuitry; and a radio frequency (RF) tuning circuitry disposed between the proximity-based communication circuitry and the capacitive pad, wherein the RF tuning circuitry comprises a series-connected capacitor and an inductor configured to obtain a voltage-based resonant frequency in the capacitive pad.

In example 2, the device as recited in example 1, wherein the capacitor is adjustable.

In example 3, the device as recited in example 1, wherein the proximity-based communication circuitry further comprises a driver component configured to have a voltage driver-configuration during the HBC communication mode.

In example 4, the device as recited in example 3, wherein the driver component further comprises a shunt resistor or an operational amplifier to derive the voltage driver configuration from an existing current driver configuration during a near field communication (NFC) communication mode.

In example 5, the device as recited in example 1, wherein the capacitive pad is further configured to detect the request signal based on a pre-configured voltage threshold.

In example 6, the device as recited in example 5, wherein the pre-configured voltage threshold is utilized by a receiving device to determine association or proximity of a transmitting device to a user.

In example 7, the device as recited in any of examples 1 to 6, wherein the capacitor is configured to generate the voltage-based resonant frequency based upon values of the series inductance, a capacitive coupling from the capacitive pad, and parasitic capacitances and inductances from the proximity-based communication circuitry.

In example 6, the device as recited in example 7, wherein the proximity-based communication circuitry further comprises a near field communication (NFC) antenna, wherein the parasitic inductances are based on the NFC antenna.

Example 9 is an apparatus comprising: a capacitive pad configured to detect and receive a request signal to engage in a human body communication (HBC) communication mode; radio frequency (RF) tuning circuitry coupled to the capacitive pad, wherein the RF tuning circuitry comprises a series connected adjustable capacitor and an inductor configured to facilitate a voltage-based resonant frequency in the capacitive pad; and a driver component coupled to the RF tuning circuitry, wherein the driver component is configured to as to a voltage driver configuration during the HBC communication mode.

In example 10, the apparatus as recited in example 9, wherein the capacitor is adjusted to generate a voltage-based resonant frequency based upon values of the series inductance and a capacitive coupling from the capacitive pad.

In example 11, the apparatus as recited in example 9, wherein the voltage-based resonant frequency generates an increase in voltage across the capacitive pad.

In example 12, the apparatus as recited in any of examples 9 to 11, wherein the capacitive pad is further configured to detect the request signal based on a pre-configured voltage threshold.

In example 13, the apparatus as recited in example 12, wherein the pre-configured voltage threshold is utilized to determine association or proximity of a transmitting device to a user.

Example 14 is a method of performing human body communication (NBC)-based data communication in a receiving device, the method comprising: detecting and receiving a request signal by a capacitive pad to engage in a HBC communication mode; configuring radio frequency (RF) tuning circuitry to generate a voltage-based resonant frequency, wherein the RF tuning circuitry utilizes a series connected capacitance-inductor drivers to generate the voltage-based frequency; and performing the HBC communication using the voltage based resonant frequency.

In example 15, the method as recited in example 14, wherein the detecting of the request signal is based on a pre-configured voltage threshold.

In example 16, the method as recited in example 15, wherein the pre-configured voltage threshold is utilized by the receiving device to determine association or proximity of a transmitting device to a user.

In example 17, the method as recited in example 14, wherein the capacitance-inductor drivers are adjustable.

In example 18, the method as recited in example 14, wherein the configuring of the RF tuning circuitry generates an increase in voltage across the capacitive pad.

In example 19, the method as recited in any of examples 14 to 18, wherein the configuring of the RF tuning circuitry comprises an adjustment of the capacitor based upon values of the series inductance, a capacitive coupling from the capacitive pad, and parasitic capacitances and inductances from a proximity-based communication circuitry.

In example 20, the method as recited in example 19, wherein the proximity-based communication circuitry further comprises a near field communication (NFC) antenna, wherein the parasitic inductances are based from the NFC antenna.

What is claimed is:

1. A device comprising:
   a capacitive pad configured to detect and receive a request signal to operate in a human body communication (HBC) communication mode;
   a proximity-based communication circuitry; and
   a radio frequency (RF) tuning circuitry disposed between the proximity-based communication circuitry and the capacitive pad, wherein the RF tuning circuitry comprises a series-connected capacitor and an inductor configured to obtain a voltage-based resonant frequency in the capacitive pad.

2. The device as recited in claim 1, wherein the capacitor is adjustable.

3. The device as recited in claim 1, wherein the capacitor is configured to generate the voltage-based resonant frequency based upon values of the series inductance, a capacitive coupling from the capacitive pad, and parasitic capacitances and inductances from the proximity-based communication circuitry.

4. The device as recited in claim 3, wherein the proximity-based communication circuitry further comprises a near field communication (NFC) antenna, wherein the parasitic inductances are based on the NFC antenna.

5. The device as recited in claim 1, wherein the proximity-based communication circuitry further comprises a driver component configured to have a voltage driver-configuration during the HBC communication mode.

6. The device as recited in claim 5, wherein the driver component further comprises a shunt resistor or an operational amplifier to derive the voltage driver configuration from an existing current driver configuration during a near field communication (NFC) communication mode.

7. The device as recited in claim 1, wherein the capacitive pad is further configured to detect the request signal based on a pre-configured voltage threshold.

8. The device as recited in claim 7, wherein the pre-configured voltage threshold is utilized by a receiving device to determine association or proximity of a transmitting device to a user.

9. An apparatus comprising:
   a capacitive pad configured to detect and receive a request signal to engage in a human body communication (HBC) communication mode;
   a radio frequency (RF) tuning circuitry coupled to the capacitive pad, wherein the RF tuning circuitry comprises a series connected adjustable capacitor and an inductor configured to facilitate a voltage-based resonant frequency in the capacitive pad; and
   a driver component coupled to the RF tuning circuitry, wherein the driver component is configured to in a voltage driver configuration during the HBC communication mode.

10. The apparatus as recited in claim 9, wherein the capacitor is adjusted to generate a voltage-based resonant frequency based upon values of the series inductance and a capacitive coupling from the capacitive pad.

11. The apparatus as recited in claim 9, wherein the voltage-based resonant frequency generates an increase in voltage across the capacitive pad.

12. The apparatus as recited in claim 9, wherein the capacitive pad is further configured to detect the request signal based on a pre-configured voltage threshold.

13. The apparatus as recited in claim 12, wherein the pre-configured voltage threshold is utilized to determine association or proximity of a transmitting device to a user.

14. A method of performing human body communication (NBC)-based data communication in a receiving device, the method comprising:
- detecting and receiving a request signal by a capacitive pad to engage in a HBC communication mode;
- configuring a radio frequency (RF) tuning circuitry to generate a voltage-based resonant frequency, wherein the RF tuning circuitry utilizes a series connected capacitance-inductor drivers to generate the voltage-based resonant frequency; and
- performing the HBC communication using the voltage based resonant frequency.

15. The method as recited in claim 14, wherein the detecting of the request signal is based on a pre-configured voltage threshold.

16. The method as recited in claim 15, wherein the pre-configured voltage threshold is utilized by the receiving device to determine association or proximity of a transmitting device to a user.

17. The method as recited in claim 14, wherein the capacitance-inductor drivers are adjustable.

18. The method as recited in claim 14, wherein the configuring of the RF tuning circuitry comprises adjusting the capacitor based upon values of the series inductance, a capacitive coupling from the capacitive pad, and parasitic capacitances and inductances from a proximity-based communication circuitry.

19. The method as recited in claim 18, wherein the proximity-based communication circuitry further comprises a near field communication (NFC) antenna, wherein the parasitic inductances are based from the NFC antenna.

20. The method as recited in claim 14, wherein the configuring of the RF tuning circuitry generates an increase in voltage across the capacitive pad.

* * * * *